Patented July 1, 1930

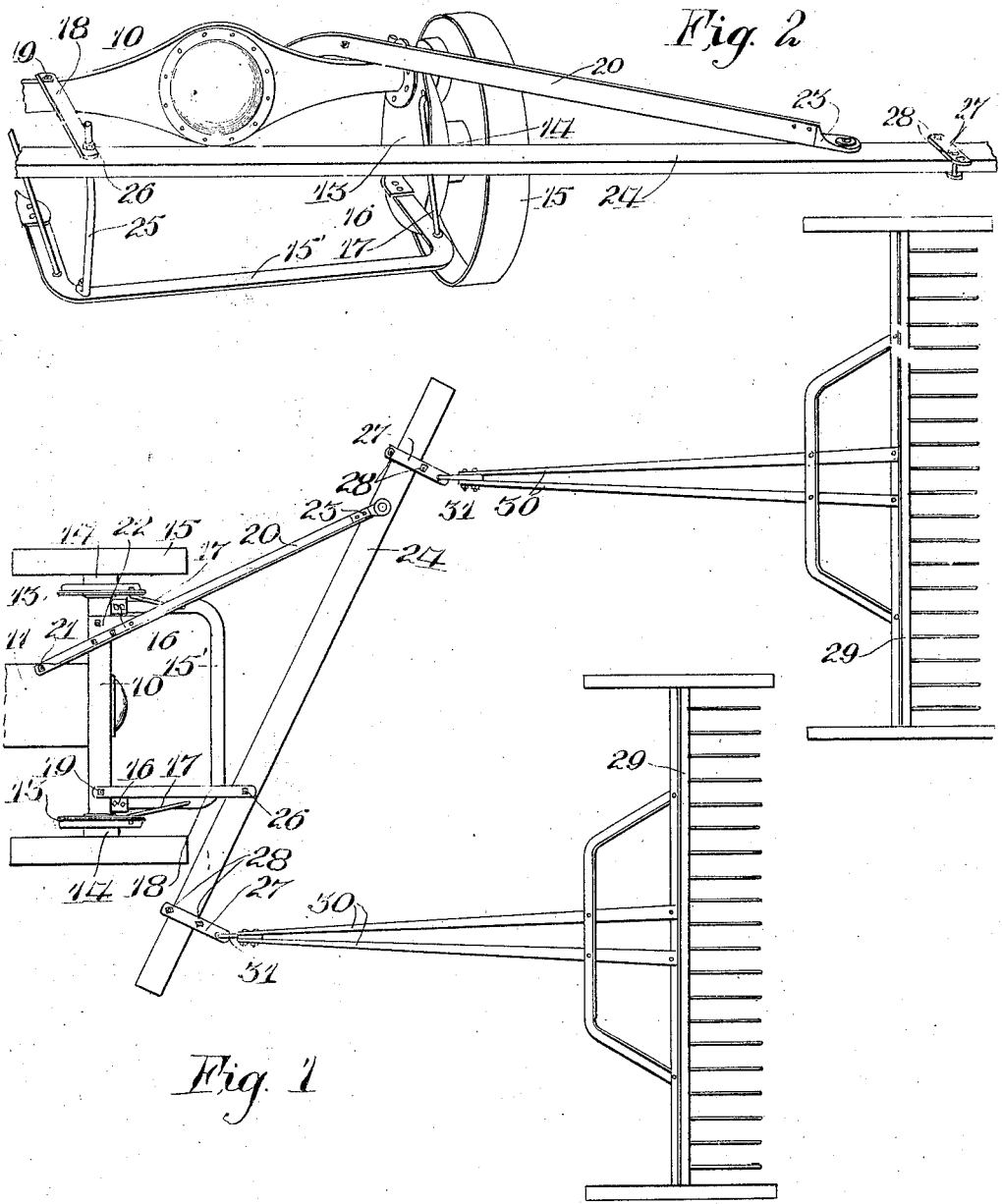

1,769,102

UNITED STATES PATENT OFFICE

BERT R. BENJAMIN, OF OAK PARK, AND CHARLES PEARSON, OF CHICAGO, ILLINOIS, ASSIGNORS TO INTERNATIONAL HARVESTER COMPANY, A CORPORATION OF NEW JERSEY

TRACTOR HITCH FOR DUMP RAKES AND THE LIKE

Application filed March 10, 1927. Serial No. 174,160.

This invention relates to hitches, and particularly to a tractor hitch for permitting a tractor to draw a plurality of implements in offset trailing relationship. More specifically, the invention relates to such a hitch for use in drawing a pair of dump rakes in the manner stated.

The objects of the invention are to provide a hitch for tractors of the all-purpose type having a relatively high, or arched rear axle structure, such hitch being designed to enable such tractors to draw a plurality of implements in offset trailing relationship without necessitating any change in the implement structure; to provide such a hitch which can be quickly attached to and be detached from such tractor rear axle structure; to provide such a hitch which is simple and cheap to manufacture; and, lastly, generally to improve tractor hitches.

These very desirable objects are achieved in one practicable form in combination with a standard type of all-purpose tractor having a relatively high arched rear axle, there being a U-shaped draft bar disposed at a low level on said rear axle, which draft bar strengthens and form a part of the rear axle structure. Connected to the rear axle structure are rearwardly extending bars, one of which is relatively short and extends generally in a longitudinal direction, the other being relatively longer and extending rearwardly in a diagonal direction. The rear ends of these two bars rigidly carry a transverse diagonally extending draft member provided at its ends with adjustable clevises to which are coupled the conventional draft poles of implements, such as dump rakes. In this manner, a pair of implements may be drawn in offset trailing relationship, as will later be more fully described.

In the accompanying sheet of drawings, wherein an illustrative embodiment of the invention has been shown,—

Figure 1 is a general plan view showing the rear end of the tractor with a pair of implements, such as dump rakes, connected thereto in offset trailing relationship by means of the improved hitch; and Figure 2 is a perspective view showing the manner of attachment of the hitch to the rear axle structure of the tractor.

As shown in the drawings, the tractor may be of the all-purpose type having a rear transverse, relatively high housing 10, from which extends a forward, centrally disposed, longitudinal body 11. The ends of the housing 10 are provided with communicating depending housings 13, which carry the hubs 14 for mounting the rear traction wheels 15. Spanning the space beneath the housing 10 is a U-shaped draft bar 15' connected by pivot members 16 to the lower ends of the depending housings 13 and adjustably hung from the upper ends of said housings by means of hangers 17.

The improved and simplified hitch embodies a relatively short, rearwardly extending horizontal bar 18 rigidly bolted at 19 to one end of the housing 10, as shown. It also embodies a second rearwardly extending, substantially horizontal bar 20, which, it will be noted, is relatively longer than the first bar, and extends diagonally. This bar 20 is rigidly bolted at 21 to the body 11 of the tractor and to a bracket 22 carried securely by the opposite end of the rear axle housing 10 of the tractor. The rear end of the bar 20 is formed with an eye piece 23, as shown. The hitch additionally embodies a transversely and diagonally arranged draft bar member 24, which will be of the required length, and, as shown, extends laterally beyond the tractor, said member 24 being securely and rigidly bolted to the eye piece 23 and to the rear end of the bar 18. That end of the hitch adjacent the bar 18 is further strengthened and supported by means of a vertical member 25, rigidly carried by the drawbar 15', said support 25 being projected thru the draft member 24 and bar 18 and made fast by a nut 26.

The diagonal member 24 carries adjacent its ends, clevis members 27, which are slidably arranged on the member 24 for adjustment, but adapted to be clamped in adjusted position and held there by means of the bolts 28, shown.

The implements to be drawn are shown in this embodiment as dump hay rakes 29, each having standard draft poles or tongues 30 of uniform length. The forward ends of each tongue carry a member 31 for detachable connection to the clevises 27, as will be understood.

In operation, it can now be seen, that the improved hitch enables the tractor to draw a plurality of implements, such as the dump rake shown, in trailing offset relationship, without altering the length of any of the draft poles of the implements. Furthermore, the implements can be made to overlap in their paths of travel by adjusting the clevises 27 on the member 24, the same means permitting drawing of implements of all standard widths. Incidentally, the draft bar 15' of the tractor can be utilized for connection of a tractor mower thereto, the mower being capable of use without in any way interfering with the use of the tractor for drawing such implements as hay rakes, because the draft bar 15' is left free for other uses, as the hitch structure is primarily connected to the tractor, independently of the draft bar 15'. Furthermore, the entire hitch is rigid and properly transmits all draft forces for the efficient operation of the drawn implements, without side draft, as the simple adjustments provided permit of the proper positioning of the implements with respect to the tractor.

It must now be appreciated that the hitch of this invention is simple and achieves all of the desirable objects heretofore recited. It is the intention to cover all such changes and modifications as do not materially depart from the scope of this invention, as is indicated in the following claim.

What is claimed as new is:

The combination with a tractor having a rear axle structure and a drawbar connected to points therebeneath and extending rearwardly therefrom, of a hitch for connecting a pair of implements to be drawn by the tractor, said hitch comprising a diagonally and rearwardly disposed support connected to the axle structure and extending above and across the drawbar, said support terminating at a point substantially rearward of and offset laterally from said drawbar, a second support carried by the axle structure also extending above the draft bar and terminating at a point substantially thereabove, a draft member carried by the rear ends of said supports, said draft member being disposed transversely of the tractor and inclined relative thereto, said member further being of a length to extend beyond each side of the tractor, a vertical member on the drawbar to support the draft member, a clevis adjacent each end of the draft member, said clevis adapted to have connected thereto implements having draft poles of uniform length so that said implements may be disposed with respect to each other in trailing offset relationship.

In testimony whereof we affix our signatures.

BERT R. BENJAMIN.
CHARLES PEARSON.